United States Patent
Kasagi

(10) Patent No.: US 9,600,763 B1
(45) Date of Patent: Mar. 21, 2017

(54) INFORMATION PROCESSING METHOD, INFORMATION PROCESSING DEVICE, AND NON-TRANSITORY RECORDING MEDIUM FOR STORING PROGRAM

(71) Applicant: FUJITSU LIMITED, Kawasaki-shi, Kanagawa (JP)

(72) Inventor: Akihiko Kasagi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/263,772

(22) Filed: Sep. 13, 2016

(30) Foreign Application Priority Data

Oct. 20, 2015 (JP) .................................. 2015-206157

(51) Int. Cl.
  *G06N 3/00*  (2006.01)
  *G06N 3/063* (2006.01)
  *G06N 3/08*  (2006.01)

(52) U.S. Cl.
  CPC .............. *G06N 3/063* (2013.01); *G06N 3/08* (2013.01)

(58) Field of Classification Search
  None
  See application file for complete search history.

(56) References Cited

U.S. PATENT DOCUMENTS

2008/0016016 A1  1/2008  Mitarai et al.
2016/0342623 A1* 11/2016  Hsiao ................ G06F 17/30247
2016/0342888 A1* 11/2016  Yang ......................... G06N 3/08
2016/0358068 A1* 12/2016  Brothers .............. G06N 99/005
2016/0358070 A1* 12/2016  Brothers .................. G06N 3/04
2016/0358337 A1* 12/2016  Dai ........................ G06T 7/0081

FOREIGN PATENT DOCUMENTS

JP    2008-009893 A    1/2008

OTHER PUBLICATIONS

Ciregan et al, Multi-col. Deep Neural Networks for Image Classification, 2012.*
He at al, Spatial Pyramid Pooling in Deep Convolutional Neural Networks for Visual Recognition, 2014.*
Simonyan et al, Very Deep Convolutional Networks for Large-Scale Image Recognition, 2014.*

* cited by examiner

*Primary Examiner* — Stanley K Hill
*Assistant Examiner* — Mikayla Chubb
(74) *Attorney, Agent, or Firm* — Fujitsu Patent Center

(57) ABSTRACT

An computer-implemented information processing method for a convolutional neural network processing input data, includes: identifying, by a computer, for each of elements of a kernel used in convolution operation, input values to be multiplied by the respective elements in the convolution operation from among input values included in the input data; calculating a sum total of identified input values; calculating, for each of the elements of the kernel, a product of the sum total and the element; calculating an average of calculated products; and performing the convolution operation within the convolutional neural network based on the average of the calculated products.

21 Claims, 26 Drawing Sheets

INPUT DATA * KERNEL

OUTPUT OF CONVOLUTIONAL LAYER $z_0 = Ae_0 + Be_1 + Ce_2 + De_5 + Ee_6 + Fe_7 + Ge_{10} + He_{11} + Ie_{12}$ $z_1 = Ae_1 + Be_2 + Ce_3 + De_6 + Ee_7 + Fe_8 + Ge_{11} + He_{12} + Ie_{13}$

⋮

$z_8 = Ae_{12} + Be_{13} + Ce_{14} + De_{17} + Ee_{18} + Fe_{19} + Ge_{22} + He_{23} + Ie_{24}$

CONVOLUTION OPERATION

OUTPUT OF
CONVOLUTIONAL LAYER

OUTPUT OF POOLING LAYER $$P_{out} = \frac{1}{9}\sum_i z_i$$

FIG. 13

| $S_0$ | $S_1$ | $S_2$ |
|---|---|---|
| $S_3$ | $S_4$ | $S_5$ |
| $S_6$ | $S_7$ | $S_8$ |

```
# N: width of input data
# k: width of kernel

# Create SAT from input data
FOR i:=0 to (N-k+1)
  FOR j:=0 to (N-k+1)
    SAT(i,j) := input(i,j) + SAT(i,j-1);
FOR i:=0 to (N-k+1)
  FOR j:=0 to (N-k+1)
    SAT(j,i) := SAT(j,i) + SAT(j-1,i);

# Compute S_table with size of kxk
FOR x:=0 to k
  FOR y:=0 to k
    S_table(x,y) := SAT((N-k+1)+x,(N-k+1)+y) - SAT((N-k+1)+x,y-1)
        - SAT(x-1,(N-k+1)+y) + SAT(x-1,y-1);

# Computation of a convolution
sum := 0;
FOR x:=0 to k
  FOR y:=0 to k
    sum := S_table(x,y) * kernel(x,y);
ave := sum / (k*k);
```

SUM TOTAL    KERNEL
TABLE

⇩

66 * 2 + 64 * 3 + 56 * 4 + 62 * 5 = 858

⇩

858 / 4 = 214.5
OUTPUT OF POOLING LAYER

FIG. 21

```
# N: width of input data
# k: width of kernel

# Computation of (N-k+1) x (N-k+1) convolutions
FOR i:=0 to (N-k+1)
  FOR j:=0 to (N-k+1)
    sum := 0;
    FOR x:=0 to k
      FOR y:=0 to k
        sum := sum + input(i+x,j+y) * kernel(x,y);
    conv_data(i,j) := sum;

# Average-Pooling
sum := 0;
FOR i:=0 to (N-k+1)
  FOR j:=0 to (N-k+1)
    sum := sum + conv_data(i,j);

ave := sum / (N-k+1) / (N-k+1);
```

INFORMATION PROCESSING METHOD, INFORMATION PROCESSING DEVICE, AND NON-TRANSITORY RECORDING MEDIUM FOR STORING PROGRAM

CROSS-REFERENCE TO RELATED APPLICATION

This application is based upon and claims the benefit of priority of the prior Japanese Patent Application No. 2015-206157, filed on Oct. 20, 2015, the entire contents of which are incorporated herein by reference.

FIELD

The embodiments discussed herein are related to a convolutional neural network.

BACKGROUND

A multilayer neural network is a neural network including a multilayer structure, and is used mainly for information processing related to audio, images, language, or the like.

A related technology is disclosed in Japanese Laid-open Patent Publication No. 2008-9893.

SUMMARY

According to an aspect of the embodiments, an computer-implemented information processing method for a convolutional neural network processing input data, includes: identifying, by a computer, for each of elements of a kernel used in convolution operation, input values to be multiplied by the respective elements in the convolution operation from among input values included in the input data; calculating a sum total of identified input values; calculating, for each of the elements of the kernel, a product of the sum total and the element; calculating an average of calculated products; and performing the convolution operation within the convolutional neural network based on the average of the calculated products.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 13 illustrates an example of a sum total table stored in a sum total table storage unit;

FIG. 14 illustrates an example of a program for performing processing;

FIG. 21 illustrates an example of a program for performing convolution operation;

FIG. 25 illustrates an example of a matrix product; and

DESCRIPTION OF EMBODIMENTS

Figure 1:
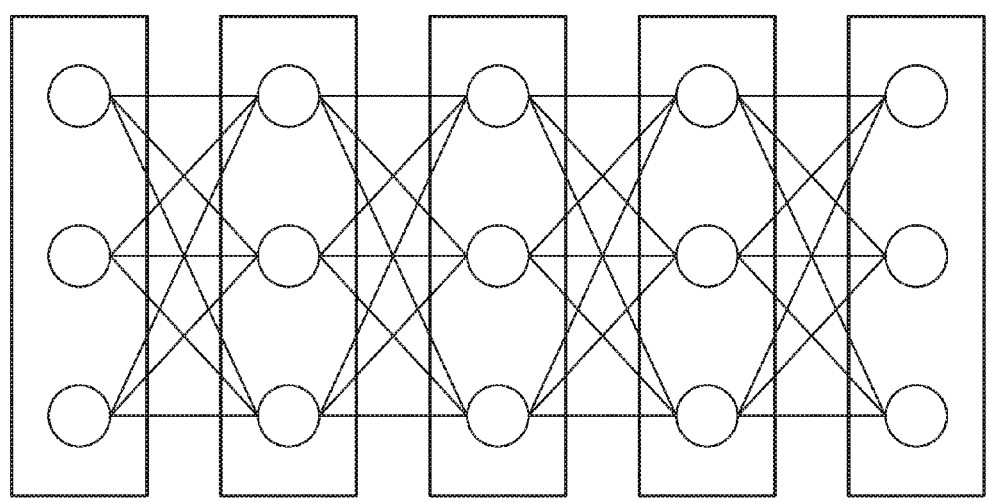
FIG. 1 illustrates an example of a multilayer neural network.

FIG. 1 illustrates an example of a multilayer neural network. In FIG. 1, a circular figure represents a node, a line segment connecting nodes to each other represents an edge, and nodes included in a same rectangle belong to a same layer. In the multilayer neural network, operation is performed in order from a low order layer to a high order layer. In a case where the more to the left a layer is located, the lower the order of the layer is in FIG. 1, for example, operation is performed in order from a left layer to a right layer. The multilayer neural network is given input data for learning. The weights of edges are updated based on a difference between output data as a result of the operation on the input data and teacher data.

Figure 2:
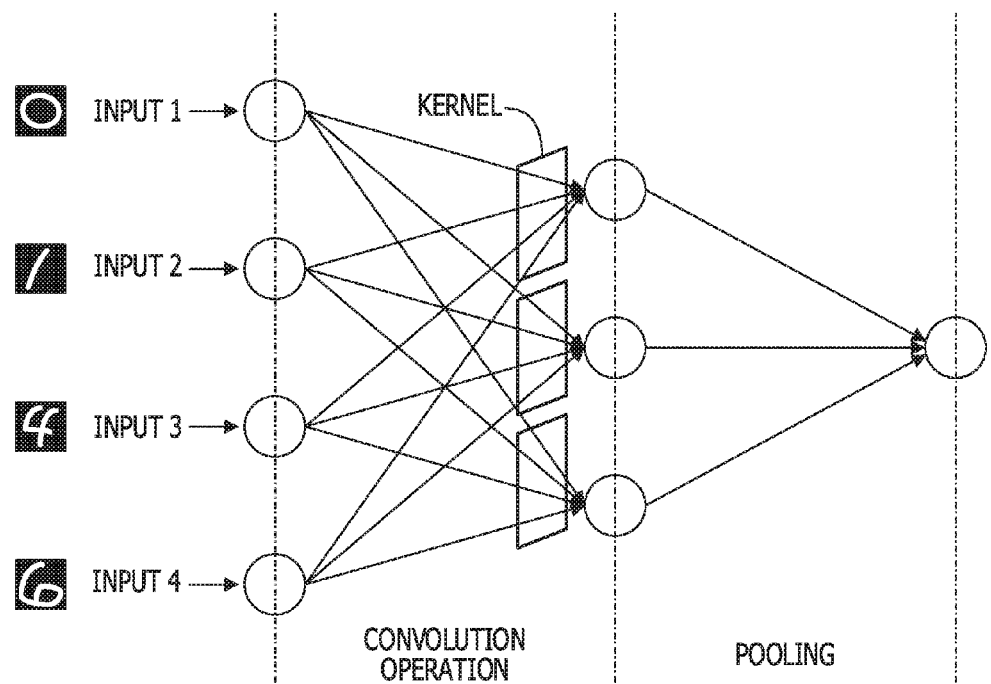
FIG. 2 illustrates an example of a convolutional neural network.

A convolutional neural network as a kind of the multilayer neural network is used in image processing. FIG. 2 illustrates an example of a convolutional neural network. The convolutional neural network includes a convolutional layer and a pooling layer. In the convolutional layer, convolution operation is performed on an input image by a kernel (referred to also as a filter) as an object of optimization by learning. Features detected in the convolutional layer are selected and integrated by pooling in the pooling layer. Therefore, the convolutional layer and the pooling layer are treated as a set in the convolutional neural network.

Figure 3:
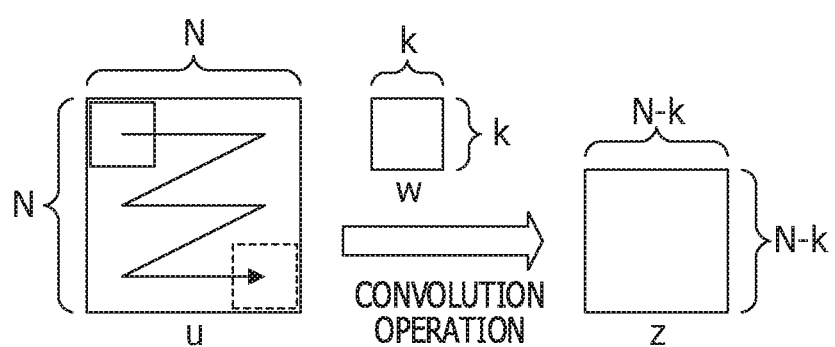
FIG. 3 illustrates an example of processing of a convolutional layer.

FIG. 3 illustrates an example of processing of a convolutional layer. As illustrated in FIG. 3, for example, when convolution operation is performed on N*N input data u by a k*k kernel w, (N−k)*(N−k) output data z is obtained. In this case, an output value $Z_{x,y}$ in the output data z is calculated as follows.

$$Z_{x,y} = \Sigma_{j=0}^{k} \Sigma_{i=0}^{k} u_{x+i,y+j} \cdot w_{i,j} \qquad \text{[Expression 1]}$$

Figure 4:
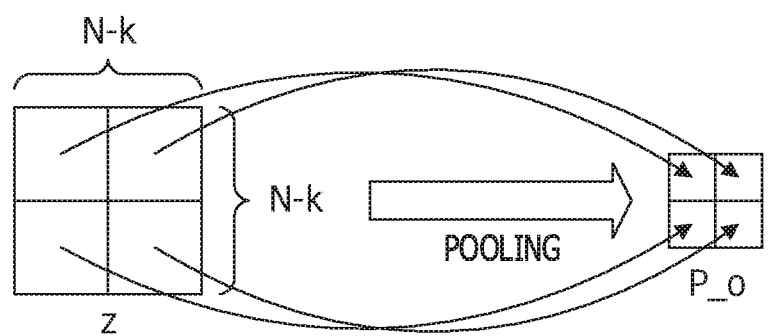
FIG. 4 illustrates an example of processing of a pooling layer.

FIG. 4 illustrates an example of processing of a pooling layer. As illustrated in FIG. 4, for example, in the pooling layer, operation is performed on each region (each of four regions in the example of FIG. 4) of the output data z output from the convolutional layer, and an operation result P_o is output. Pooling includes maximum pooling and average pooling. The former is processing of identifying maximum values of values included in the regions. The latter is processing of calculating averages of the values included in the regions.

Machine learning by the multilayer neural network takes a very long learning time. Parallel distributed processing may be performed to shorten the learning time. The learning time is lengthened due mainly to a large amount of operation of the convolution operation. Thus, reducing the amount of operation of the convolution operation may greatly shorten the learning time.

Figure 5:
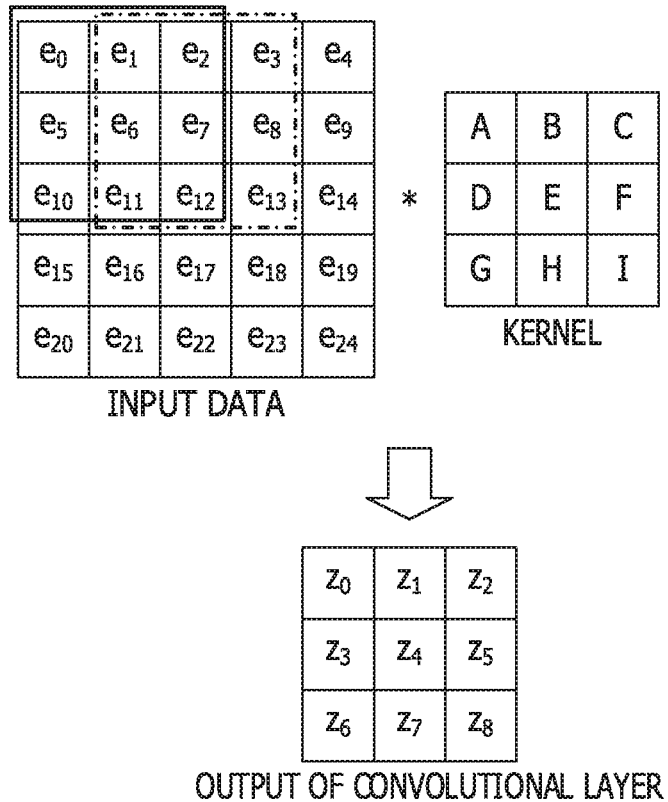
FIG. 5 illustrates an example of convolution operation.
Figure 6:
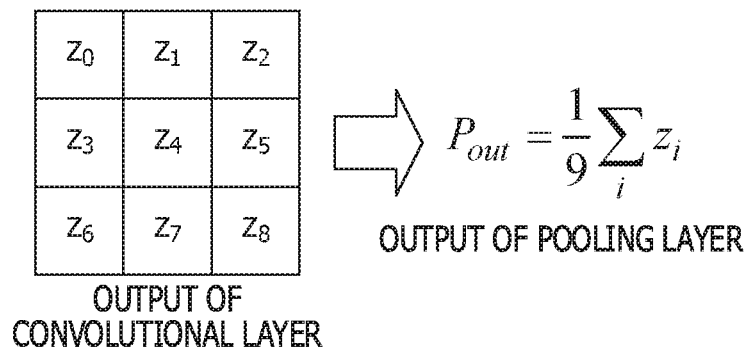
FIG. 6 illustrates an example of average pooling.

FIG. 5 illustrates an example of convolution operation. In the convolution operation, a kernel is applied to partial regions having a same size as a kernel size, the partial regions being included in input data. In FIG. 5, for example, the kernel is applied to nine partial regions having a size of 3*3, and outputs $z_0$ to $z_8$ are calculated. The above-described calculation equation may be used as a calculation equation. FIG. 6 illustrates an example of average pooling. The average pooling performs processing of obtaining an average of the outputs of the convolutional layer. For example, in FIG. 6, an output $P_{out}$ of the pooling layer is calculated by dividing a sum total of values included in the outputs of the convolutional layer by the number (=9) of the values.

An amount of operation may be reduced by calculating the output $P_{out}$ of the pooling layer by another method, for example.

A sum total of $z_0$ to $z_8$ is obtained in an equation illustrated in FIG. 6. The right side of this equation is rewritten as $\{A(e_0+e_1+ \ldots +e_{12})+B(e_1+e_2+ \ldots +e_{13})+C(e_2+e_3+ \ldots +e_{14})+D(e_5+e_6+ \ldots +e_{17})+E(e_6+e_7+ \ldots +e_{18})+F(e_7+e_8+ \ldots +e_{19})+G(e_{10}+e_{11}+ \ldots +e_{22})+H(e_{11}+e_{12}+ \ldots +e_{23})+I(e_{12}+e_{13}+ \ldots +e_{24})\}/9$. For example, each kernel element is multiplied by a sum total of input values within a rectangular region in the input data. For example, a kernel element "A" is multiplied by input values within a partial region enclosed by a solid line in the input data illustrated in FIG. 5, and a kernel element "B" is multiplied by input values within a partial region enclosed by alternate long and short dashed lines in the input data illustrated in FIG. 5. Hence, when a sum total of input values within each rectangular region is calculated at a high speed, a time taken to calculate the output of the pooling layer may be greatly shortened.

Figure 7:
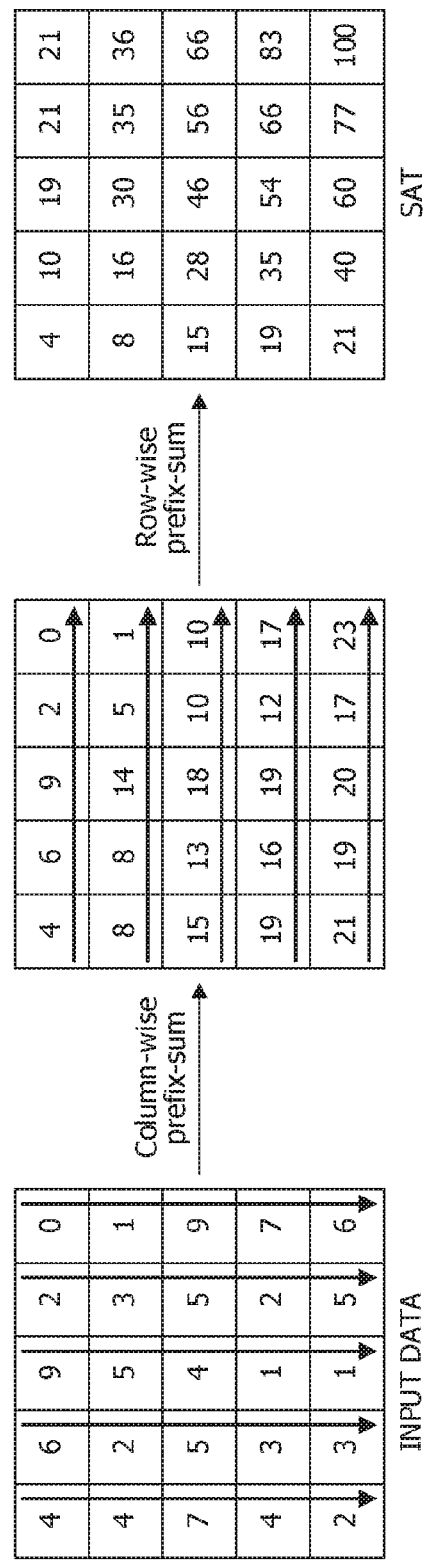
FIG. 7 illustrates an example of processing of generating a summed area table (SAT)

A sum total of input values within a rectangular region may for example be calculated by using a summed area table (SAT) (referred to also as an integral image). FIG. 7 illustrates an example of processing of generating a SAT. When a SAT is generated from input data as matrix data as illustrated in FIG. 7, for example, intermediate data is generated by obtaining cumulative sums in a column direction. A SAT is generated by obtaining cumulative sums of the intermediate data in a row direction. Each element of the SAT represents a sum total of an input value corresponding to the element and input values corresponding to elements located on the left or above the element. For example, the element "46" corresponds to 4+6+9+4+2+5+7+5+4.

Figure 8:
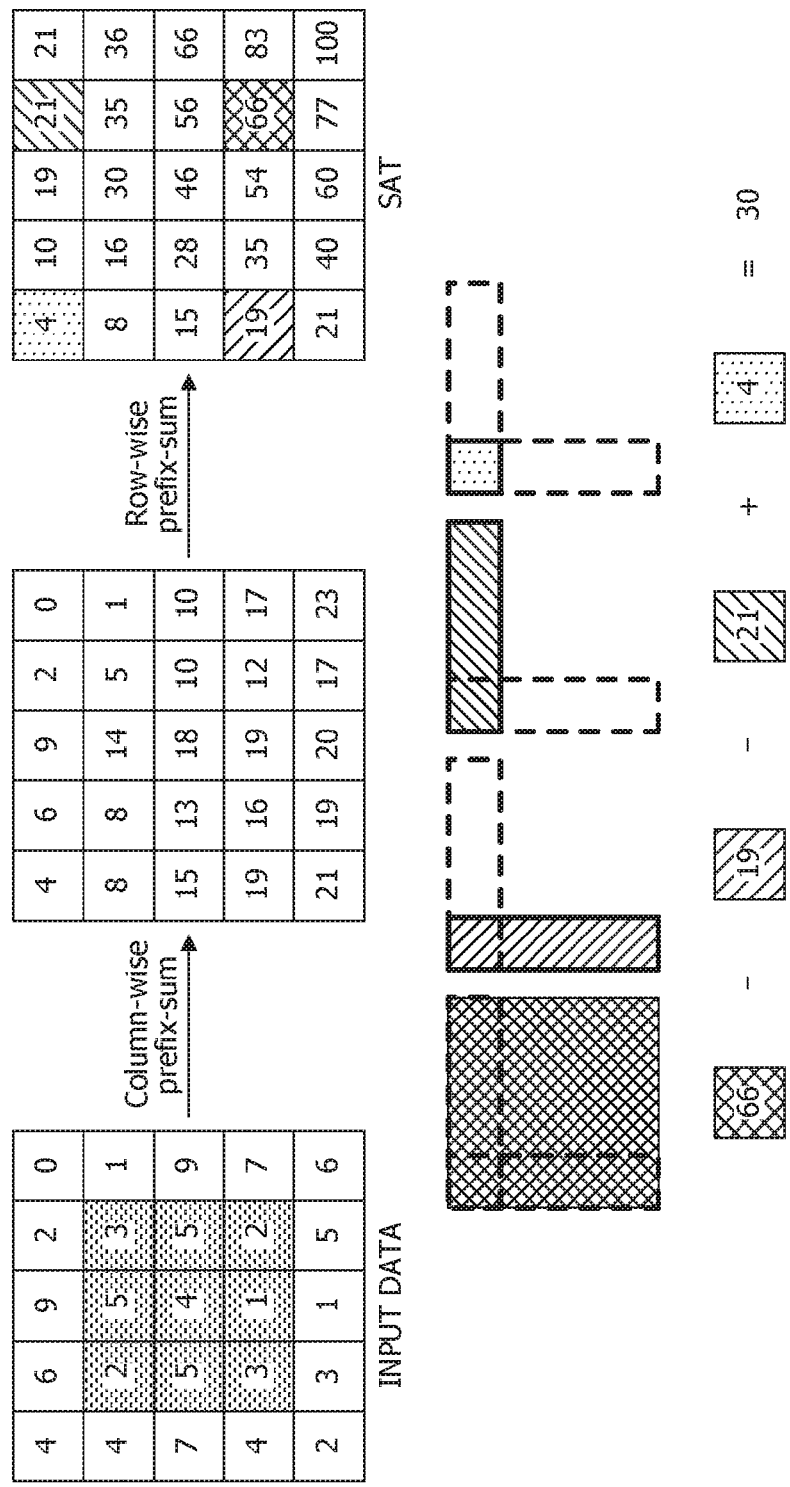
FIG. 8 illustrates an example of a method of calculating a sum total of input values within a rectangular region using an SAT.

FIG. 8 illustrates an example of a method of calculating a sum total of input values within a rectangular region using a SAT. A sum total of input values within a hatched rectangular region in the input data, for example, may be calculated. In this case, the sum total of the input values within the rectangular region is calculated by subtracting an element that is leftwardly adjacent to an element of the SAT which element corresponds to a lower left element within the rectangular region and an element that is upwardly adjacent to an element of the SAT which element corresponds to an upper right element within the rectangular region from an element of the SAT which element corresponds to a lower right element within the rectangular region, and adding an element upwardly and leftwardly adjacent to an element of the SAT which element corresponds to an upper left element within the rectangular region.

A time taken to complete the average pooling may be shortened by thus replacing the convolution operation with a problem of obtaining sum totals of input values within rectangular regions and obtaining the sum totals by the SAT.

Figure 9:
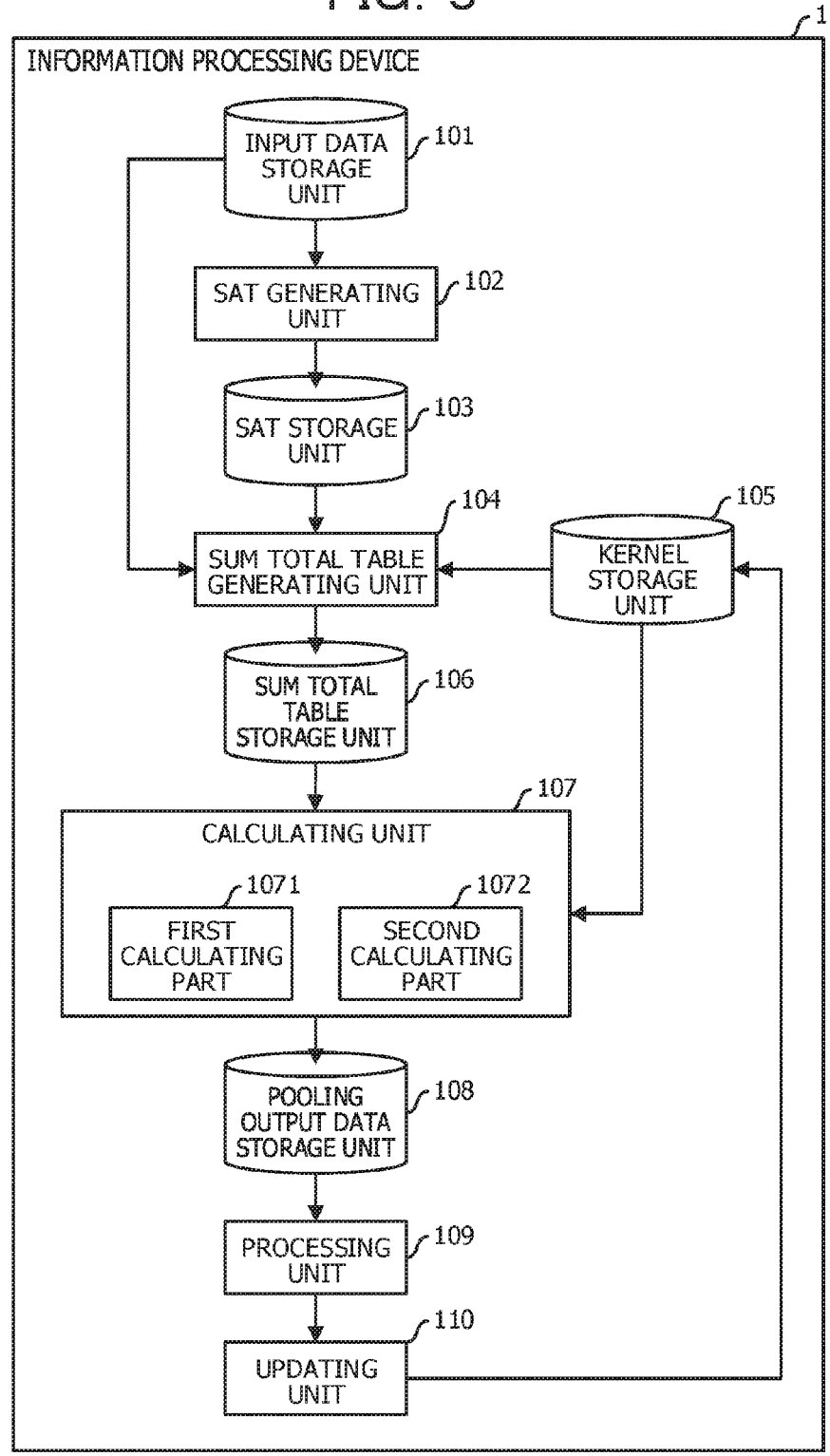
FIG. 9 illustrates an example of functional blocks of an information processing device.

FIG. 9 illustrates an example of functional blocks of an information processing device. An information processing device 1 includes an input data storage unit 101, a SAT generating unit 102, a SAT storage unit 103, a sum total table generating unit 104, a kernel storage unit 105, a sum total table storage unit 106, a calculating unit 107, a pooling output data storage unit 108, a processing unit 109, and an updating unit 110. The calculating unit 107 includes a first calculating part 1071 and a second calculating part 1072.

The SAT generating unit 102 performs processing on the basis of data stored in the input data storage unit 101, and stores a result of the processing in the SAT storage unit 103. The sum total table generating unit 104 performs processing based on the data stored in the input data storage unit 101, the data stored in the SAT storage unit 103, and data stored in the kernel storage unit 105, and stores a result of the processing in the sum total table storage unit 106. The first calculating part 1071 and the second calculating part 1072 in the calculating unit 107 perform processing on the basis of the data stored in the kernel storage unit 105 and the data stored in the sum total table storage unit 106, and stores a result of the processing in the pooling output data storage unit 108. The processing unit 109 performs processing based on the data stored in the pooling output data storage unit 108, and notifies a result of the processing to the updating unit 110. The updating unit 110 updates the kernel stored in the kernel storage unit 105 based on the processing result received from the processing unit 109.

Figure 10:
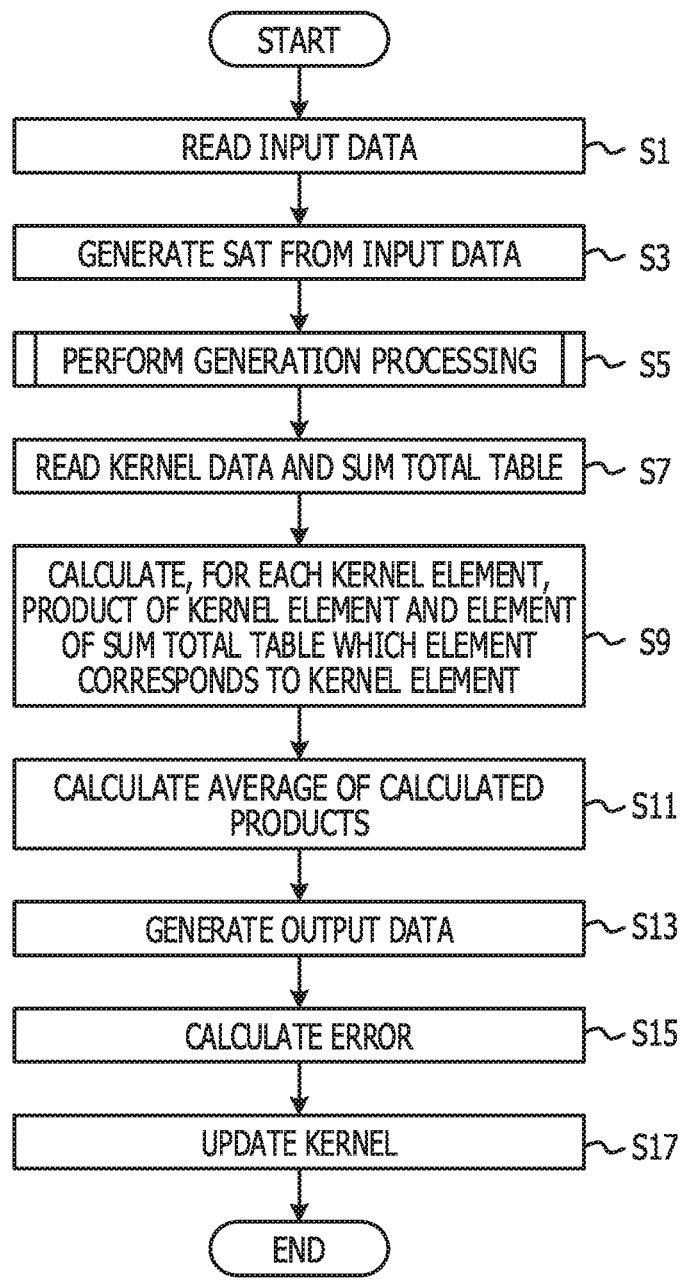
FIG. 10 illustrates an example of main processing.

FIG. 10 illustrates an example of main processing. For example, the processing of the pooling layer may be average pooling, and a stride (for example an interval of movement in a horizontal direction) in the convolutional layer may be one. In order to simplify description, for example, a mini-batch size may be set to one, the number of kernels may be set to one, and the output of the pooling layer may be one element.

The SAT generating unit 102 reads the input data stored in the input data storage unit 101 (FIG. 10: operation S1). The input data may be for example image data, and may include a plurality of input values (for example pixel values). The input data may be for example data other than image data.

The SAT generating unit 102 generates a SAT from the input data read in operation S1 (operation S3), and stores the SAT in the SAT storage unit 103.

Figure 11:
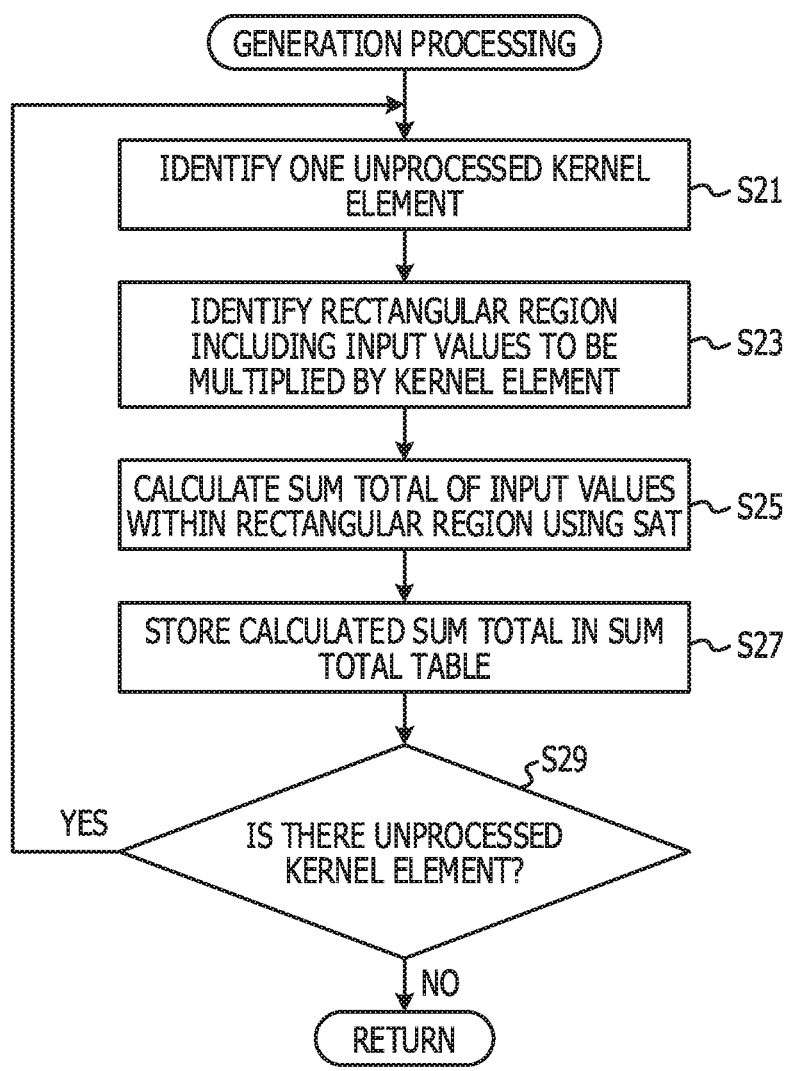
FIG. 11 illustrates an example of generation processing.
Figure 12:
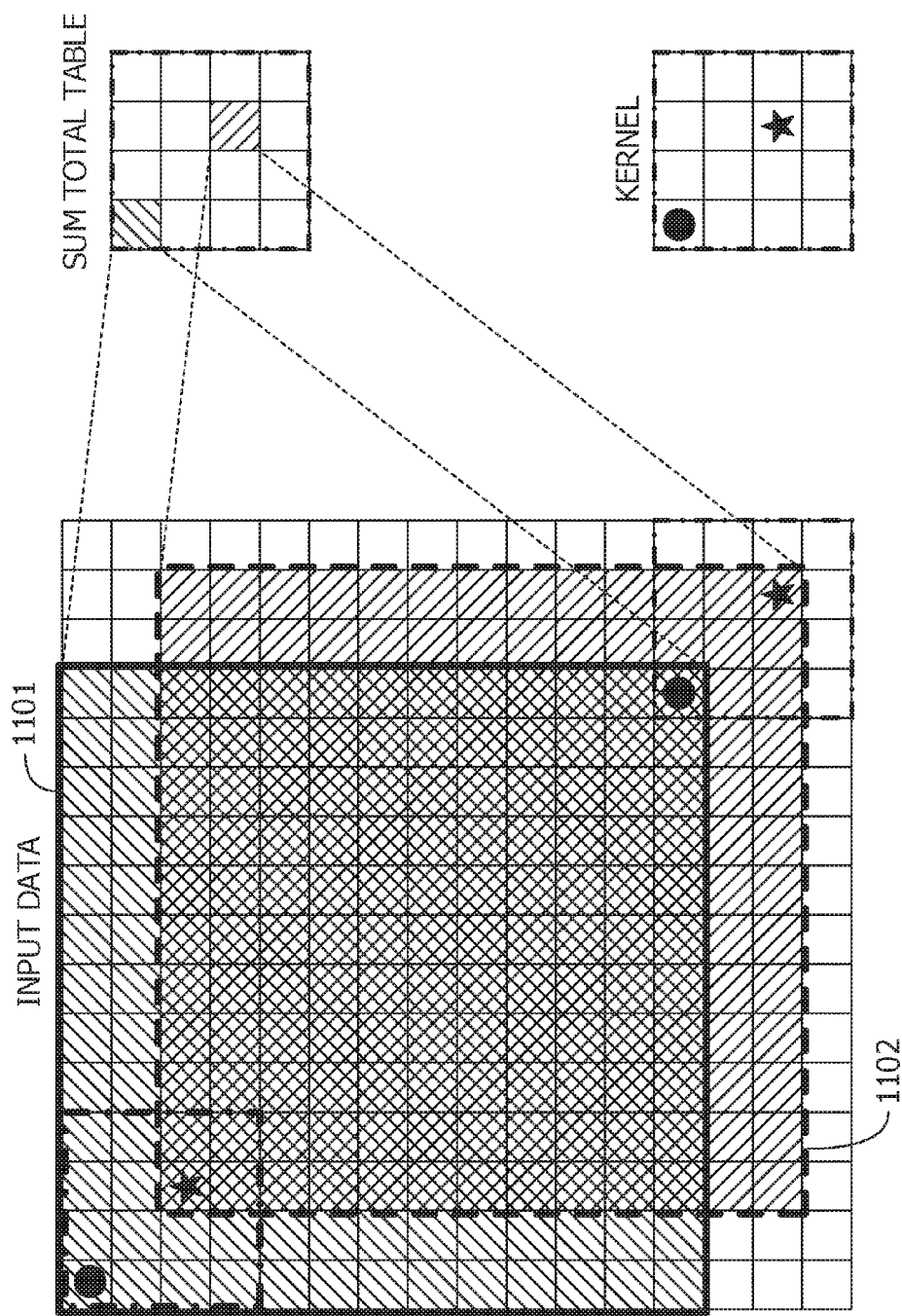
FIG. 12 illustrates an example of relation between kernel elements and input data.

The sum total table generating unit 104 performs generation processing (operation S5). FIG. 11 illustrates an example of the generation processing. FIG. 12 illustrates an example of relation between kernel elements and the input data. FIG. 13 illustrates an example of a sum total table stored in a sum total table storage unit. The sum total table storage unit referred to in FIG. 13 may be the sum total table storage unit 106 illustrated in FIG. 9.

The sum total table generating unit 104 identifies, from among elements of a kernel stored in the kernel storage unit 105 (which elements will hereinafter be referred to as kernel elements), one kernel element which has not been processed (hereinafter referred to as a kernel element to be processed) (FIG. 11: operation S21).

The sum total table generating unit 104 identifies a rectangular region including input values to be multiplied by the kernel element to be processed (which rectangular region will hereinafter be referred to as a rectangular region to be processed) from the input data stored in the input data storage unit 101 (operation S23).

The sum total table generating unit 104 calculates a sum total of input values within the rectangular region to be processed using the SAT (operation S25). The above-described method may be used as a method of calculating the sum total of the input values within the rectangular region.

The sum total table generating unit 104 stores the sum total calculated in operation S25 in the sum total table in the sum total table storage unit 106 (operation S27). The sum total is stored in a position corresponding to the position of the kernel element to be multiplied. For example, as illustrated in FIG. 12, when a kernel element of a circle mark is to be multiplied by a sum total of input values within a rectangular region 1101, and a kernel element of a star mark is to be multiplied by a sum total of input values within a rectangular region 1102 in the input data, the sum total calculated for the kernel element of the circle mark is stored in a position corresponding to the position of the kernel element of the circle mark, and the sum total calculated for the kernel element of the star mark is stored in a position corresponding to the position of the kernel element of the star mark. Supposing that the size of the input data is N*N, and that the size of the kernel is k*k, the size of the rectangular regions is (N−k+1)*(N−k+1).

FIG. 13 illustrates a sum total table stored in the sum total table storage unit 106 in the case where the input data is the data illustrated in FIG. 5. Each element of the sum total table may correspond to a sum total of input values within a rectangular region in the input data illustrated in FIG. 5.

In FIG. 11, the sum total table generating unit 104 determines whether there is a kernel element which has not been processed (operation S29). When there is a kernel element which has not been processed (operation S29: a Yes route), the processing returns to operation S21. When there is no kernel element which has not been processed (operation S29: a No route), on the other hand, the processing returns to the caller processing.

In FIG. 10, the first calculating part 1071 in the calculating unit 107 reads the data of the kernel from the kernel storage unit 105, and reads the sum total table stored in the sum total table storage unit 106 (operation S7). The first calculating part 1071 calculates, for each kernel element, a product of the kernel element and an element of the sum total table which element corresponds to the kernel element (operation S9). For example, when operation S9 is performed for the kernel illustrated in FIG. 5 and the sum total table illustrated in FIG. 13, $As_0$, $Bs_1$, $Cs_2$, $Ds_3$, $Es_4$, $Fs_5$, $Gs_6$, $Hs_7$, and $Is_8$ are calculated.

The second calculating part 1072 calculates an average of the products calculated in operation S9 (operation S11), and stores the calculated average in the pooling output data storage unit 108. FIG. 14 illustrates an example of a program for performing processing. A program for performing processing similar to operations S1 to S11 may be a program as illustrated in FIG. 14, for example, but is not limited to such a program.

The processing unit 109 reads the data stored in the pooling output data storage unit 108, and generates output data of the convolutional neural network by performing processing for a layer subsequent to the convolutional layer and the pooling layer (the subsequent layer is for example a fully connected layer, a softmax layer, or the like) on the read data (operation S13). When there is no layer subsequent to the convolutional layer and the pooling layer, operation S13 is skipped, and the average calculated in operation S11 is the output data. Operation S13 may be processing performed in the convolutional neural network.

The processing unit 109 calculates an error between the output data generated in operation S13 and teacher data prepared in advance (operation S15), and notifies the error calculated in operation S15 to the updating unit 110. In response to this, the updating unit 110 updates the kernel stored in the kernel storage unit 105 (operation S17). The processing is ended. The processing of operations S15 and S17 may be processing performed in the convolutional neural network.

Figure 15:
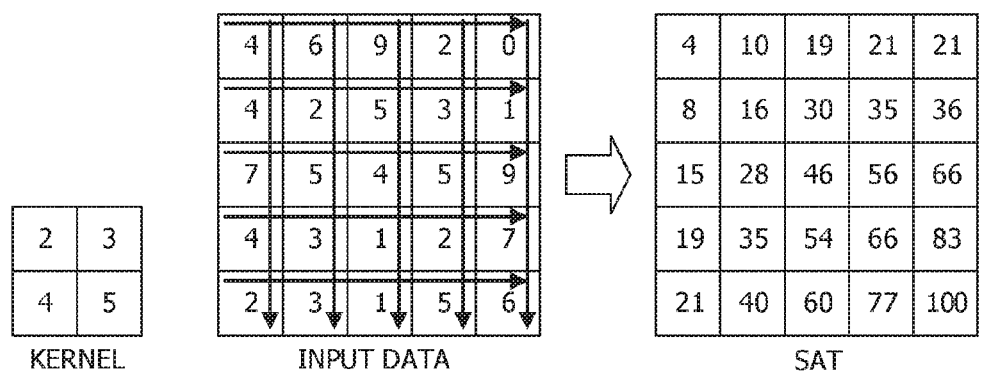
FIG. 15 illustrates an example of calculation.
Figure 16:
FIG. 16 illustrates an example of calculation.
Figure 17:
FIG. 17 illustrates an example of calculation.

FIGS. 15 to 17 illustrate an example of calculation. In FIGS. 15 to 17, the output of the pooling layer may be one element. As illustrated in FIG. 15, the size of the kernel is 2*2, and the size of the input data is 5*5. In this case, a SAT having a size of 5*5 is generated by calculating cumulative sums of the input values included in the input data in the column direction and the row direction.

As illustrated in FIG. 16, sum totals of input values within rectangular regions having a size of 4 (=5−2+1)*4 are calculated using the SAT. A sum total corresponding to a kernel element in a first column and a first row is 66. A sum total corresponding to a kernel element in a second column and the first row is 64. A sum total corresponding to a kernel element in the first column and a second row is 56. A sum total corresponding to a kernel element in the second column and the second row is 62. Suppose that values outside the frame of the SAT are zero. The calculated sum totals are stored in the sum total table.

As illustrated in FIG. 17, the output of the pooling layer is generated by the convolution operation and the calculation of the average in operations S9 and S11, respectively.

As described above, a sum total of input values within an arbitrary rectangular region is calculated in a constant time by using the SAT. An amount of operation of the convolution operation may therefore be reduced. The amount of operation is increased for example when the size and number of kernels are increased in the convolution operation. However, the above-described method may stably reduce the amount of operation of the convolution operation without depending on the size of the kernels. For example, in the convolution operation, when the kernel size is different, matrices put into a library are changed. Thus, a convolutional neural network having a different kernel size is treated as a different convolutional neural network. With the above-described method, for example, there is no problem even when the kernel size is not uniform.

While the output of the pooling layer may be one element, the output of the pooling layer may be a plurality of elements. In addition, the method of using the SAT may be changed.

Figure 18:
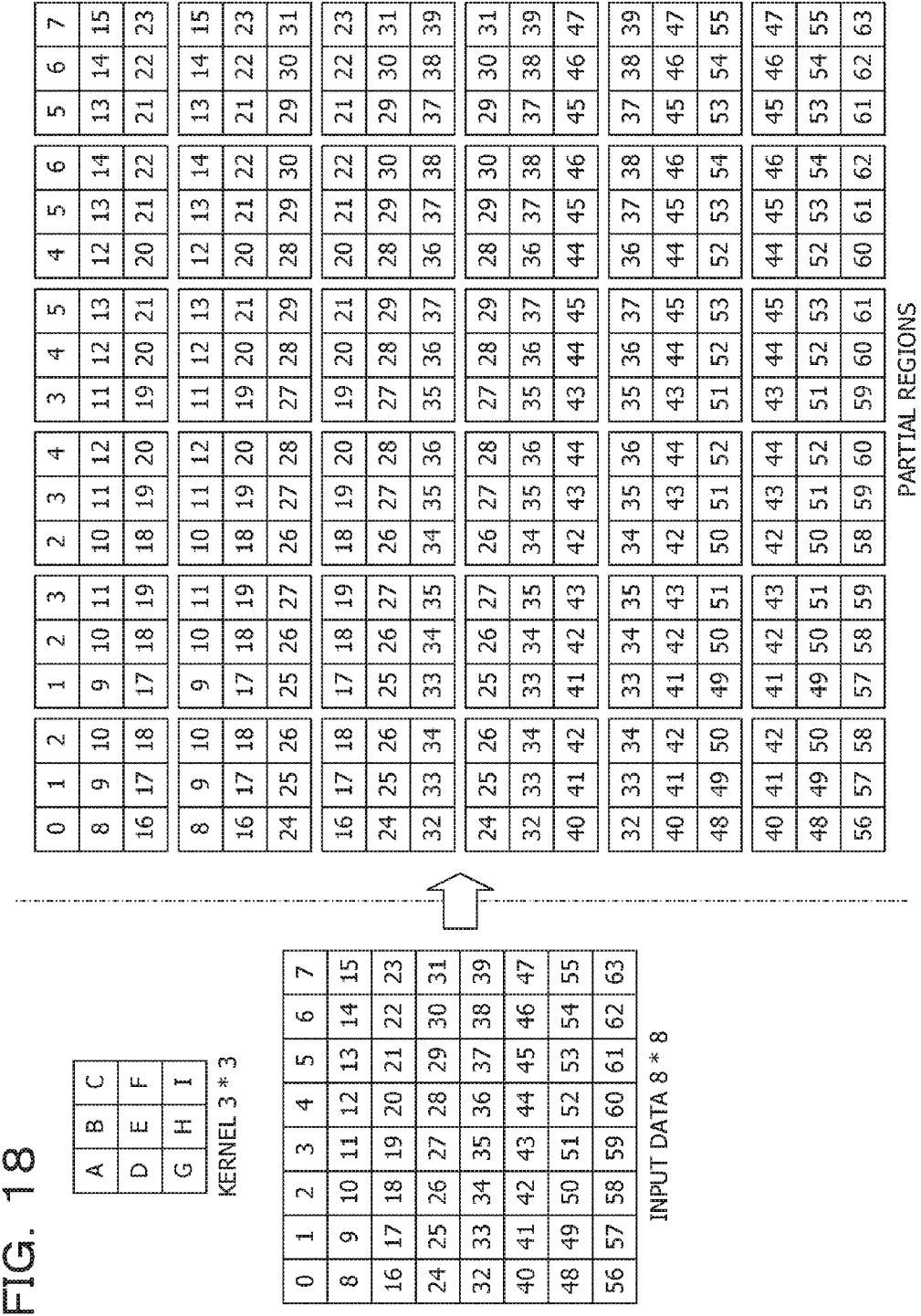
FIG. 18 illustrates an example in which an output of a pooling layer is a plurality of elements.
Figure 19:
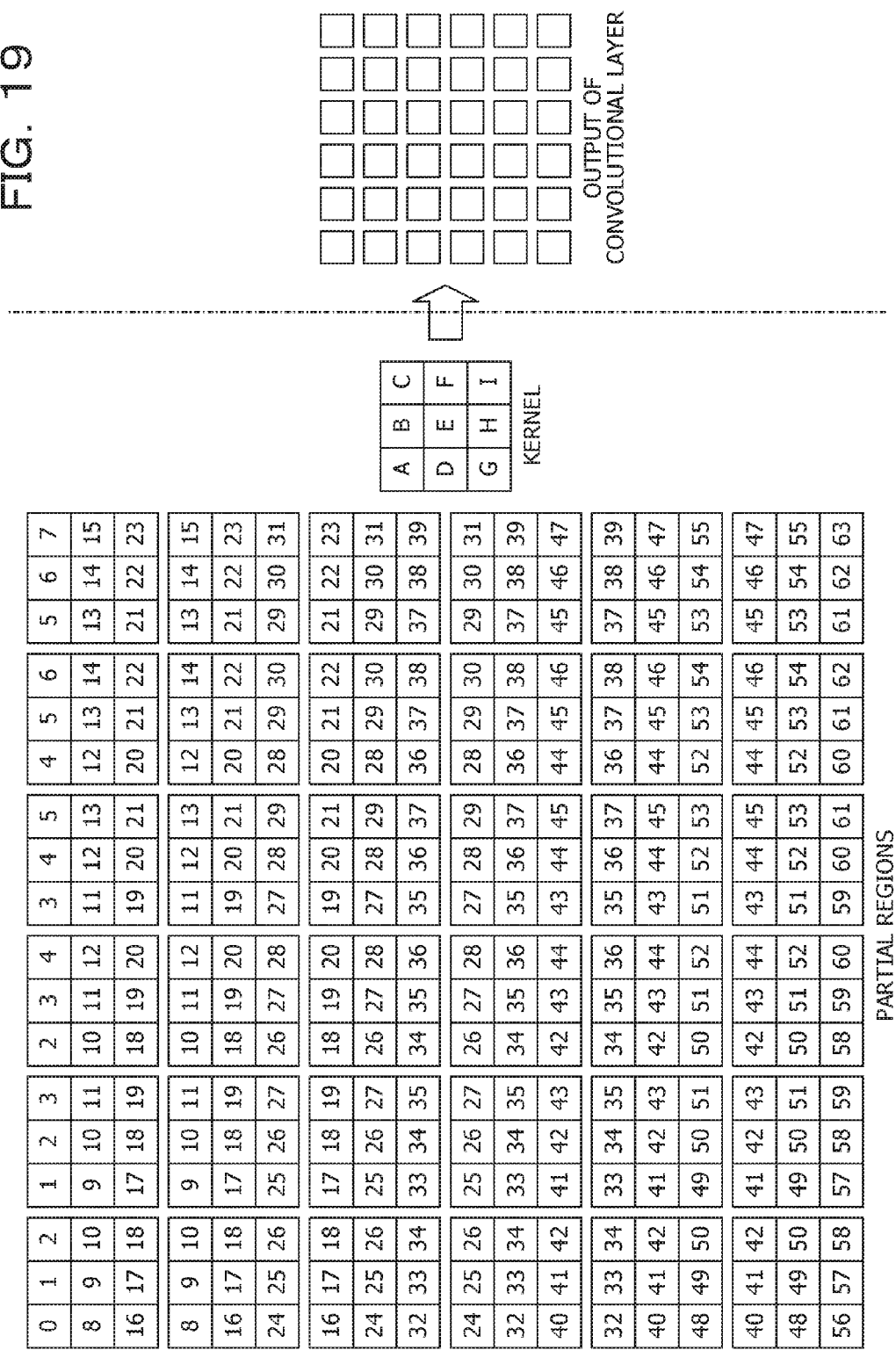
FIG. 19 illustrates an example in which an output of a pooling layer is a plurality of elements.
Figure 20:
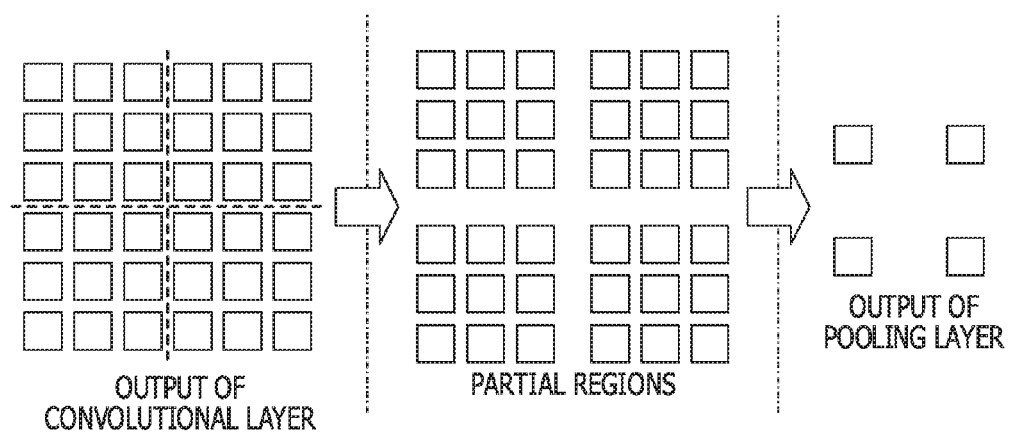
FIG. 20 illustrates an example in which an output of a pooling layer is a plurality of elements.

FIG. 18, FIG. 19, FIG. 20, FIG. 22, and FIG. 23 illustrate an example in which an output of a pooling layer is a plurality of elements. FIG. 21 illustrates an example of a program for performing convolution operation. As illustrated in FIG. 18, for example, the size of input data may be 8*8, and the kernel size may be 3*3. The output of the pooling layer may be four (=2*2) elements. As an example, when the convolution operation is to be performed, 36 partial regions to which a kernel is applied are generated from the input data, and the convolution operation is performed using each partial region and the kernel. As illustrated in FIG. 19, the output of the convolutional layer includes 36 elements. As illustrated in FIG. 20, the output of the convolutional layer is divided into four (=2*2) partial regions, and an average of the elements included in each partial region is calculated. As a result, the output of the pooling layer is four elements. A program for performing the convolution operation may be a program as illustrated in FIG. 21, for example.

Figure 22:
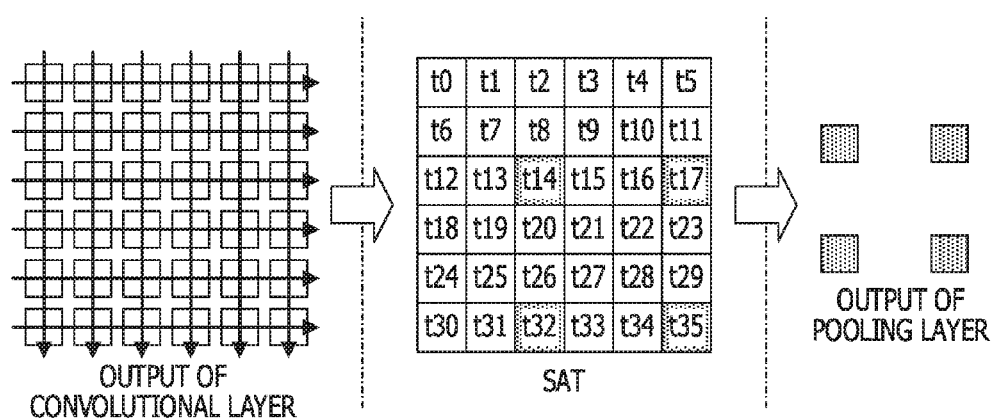
FIG. 22 illustrates an example in which an output of a pooling layer is a plurality of elements.

As an example, a SAT may be generated from the output of the convolutional layer. As illustrated in FIG. 22, for example, a SAT is generated by calculating cumulative sums in the column direction of the output of the convolutional layer, and further calculating cumulative sums in the row direction. Thus, a value obtained by dividing an element t14 of the SAT by nine as the number of elements, a value obtained by dividing an element t17 of the SAT by nine as the number of elements, a value obtained by dividing an element t32 of the SAT by nine as the number of elements, and a value obtained by dividing an element t35 of the SAT by nine as the number of elements may correspond to the output of the pooling layer. However, this method generates four SATs, and may therefore involve a larger amount of operation than that of the convolution operation.

Figure 23:
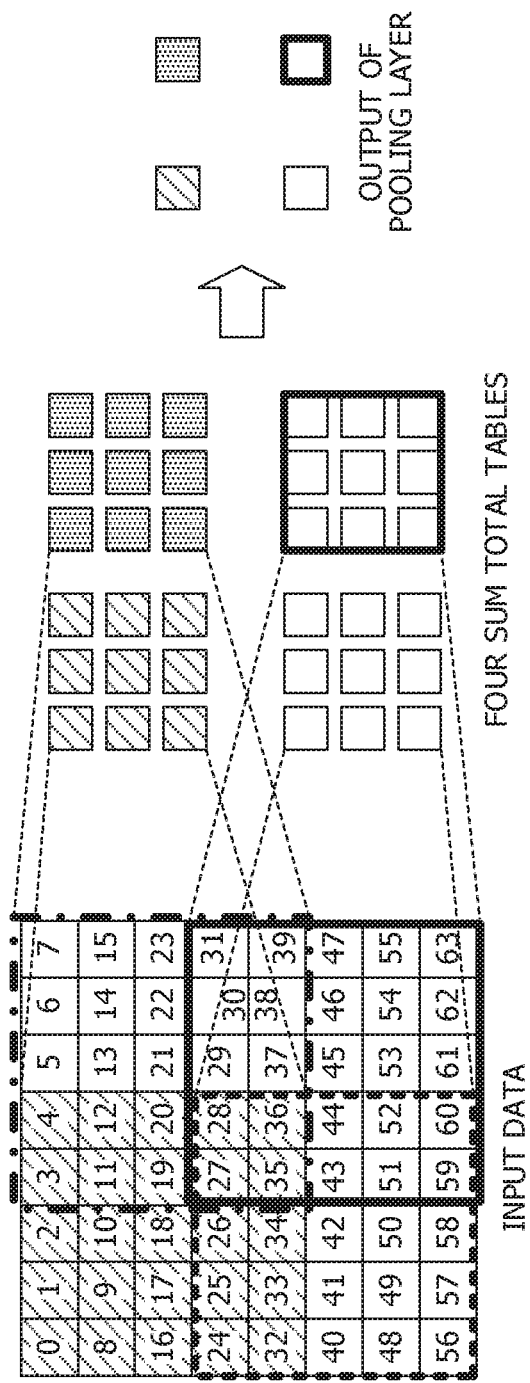
FIG. 23 illustrates an example in which an output of a pooling layer is a plurality of elements.

Hence, when the SATs are generated, it may be effective to generate the SATs from the input data, as described above. As illustrated in FIG. 23, for example, four rectangular regions may be generated from the input data, and the above-described processing may be performed for each rectangular region. According to the above-described method, a sum total of input values within an arbitrary rectangular region can be obtained when there is one SAT generated from the input data. When a SAT is generated from the input data, the SAT is independent of the kernel. One SAT suffices even when there are a plurality of kernels.

As an example, the functional block configuration of the above-described information processing device 1 may not coincide with an actual program module configuration.

The configuration of each of the tables described above is an example, and is not limited to the above-described configuration. In the above processing flows, the order of the processing may be changed, and the processing may be performed in parallel, unless the processing result changes.

The shape of the kernel is not limited to a square, and the above-described processing may be applied to arbitrary rectangular kernels.

The number of convolutional layers may not be limited to one. For example, the output of the pooling layer may be generated at a time based on a once generated SAT even in a convolutional network in which a plurality of convolutional layers are coupled.

The convolution operation may be performed using single precision floating general matrix multiply (SGEMM), for example.

Figure 24:
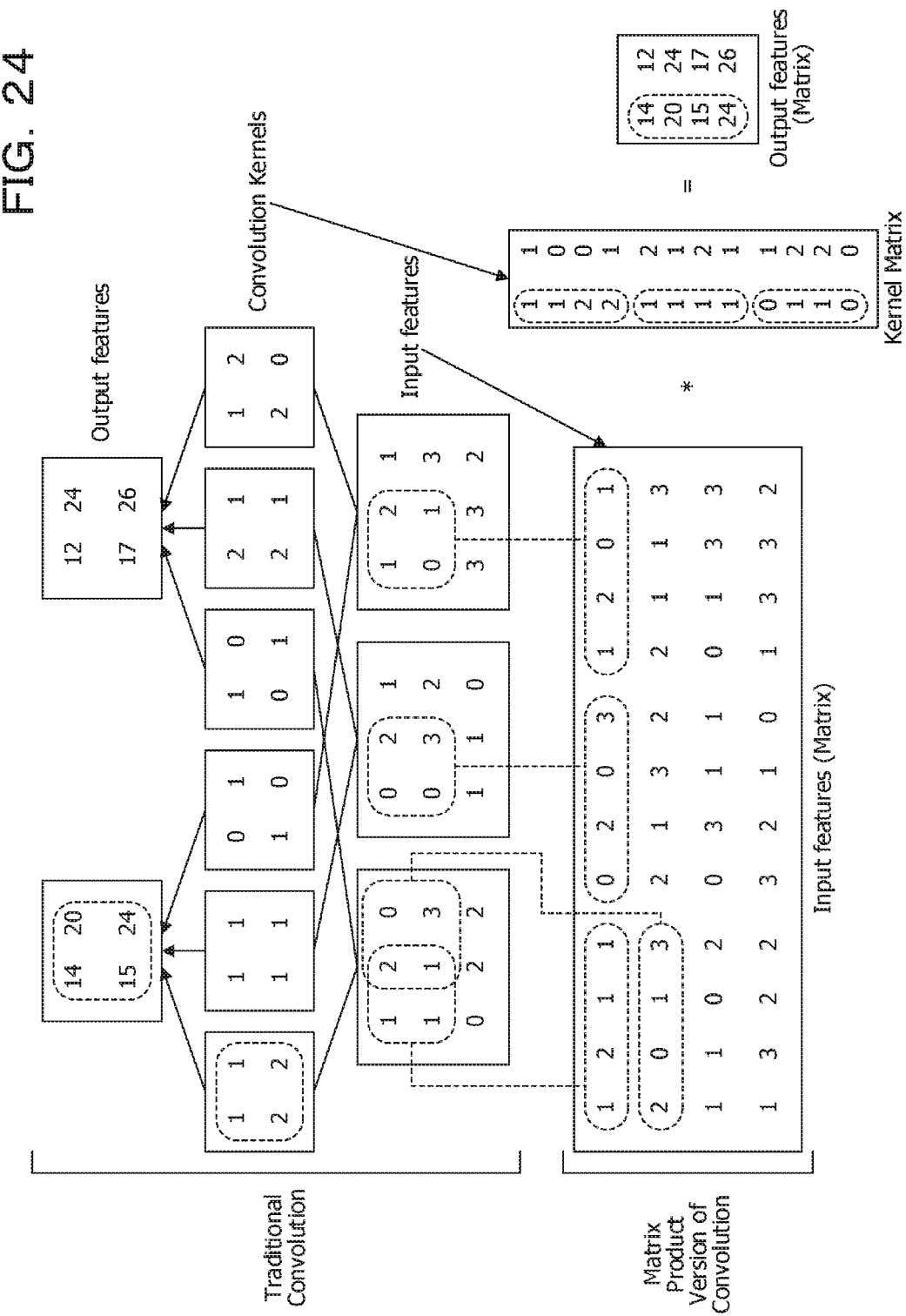
FIG. 24 illustrates an example of convolution operation using single precision floating general matrix multiply (SGEMM)
Figure 25:
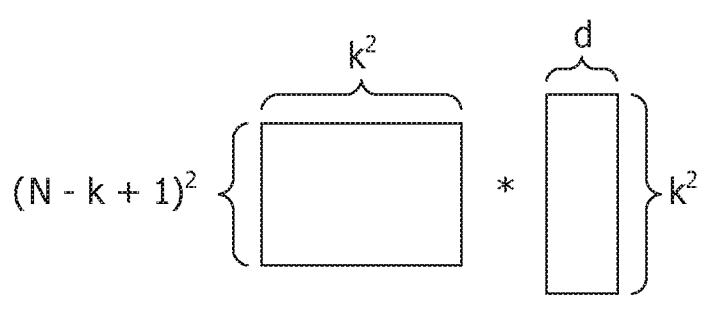
Figure 26:
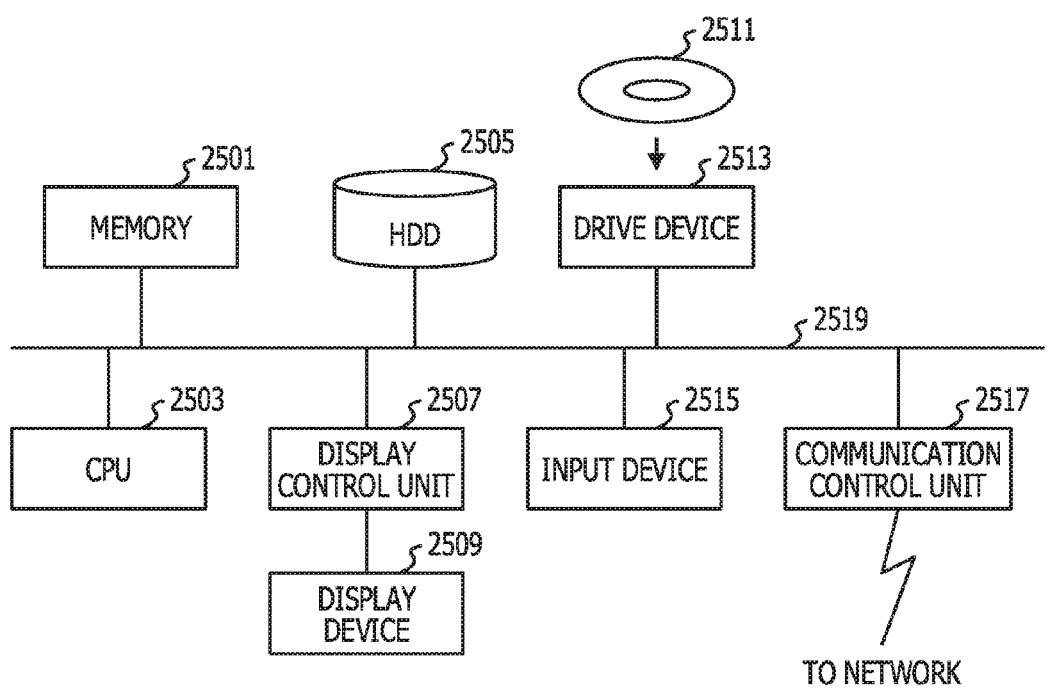
FIG. 26 illustrates an example of functional blocks of a computer.

FIG. 24 illustrates an example of convolution operation using SGEMM. FIG. 25 illustrates an example of a matrix product. FIG. 26 illustrates an example of functional blocks of a computer. In SGEMM, convolution operation is performed by high-speed matrix product calculation by a graphics processing unit (GPU). Thus, input images and kernels are transformed into forms that can be put in a matrix calculation library. As illustrated in FIG. 24, a matrix corresponding to the input images and a matrix corresponding to the kernels are generated, and a matrix product of these matrices is calculated. Supposing that the size of the input image is N*N, that a mini-batch size is one, that the size of the kernels is k*k, and that the number of kernels is d, a matrix product as illustrated in FIG. 25 is calculated. In this case, an amount of operation of multiplication is $dk^2(N-k+1)^2$, and an amount of operation of addition is also $dk^2(N-k+1)^2$. In addition to this, permutation operation in matrix generation and processing in the pooling layer are performed to use SGEMM. Thus, the amount of operation may be further increased.

As an example, the following are performed: (1) calculation of cumulative sums in each column; (2) calculation of cumulative sums in each row; (3) processing of obtaining elements whose number is obtained by multiplying the number of kernels by four and processing of calculating sum totals; (4) multiplication of each of the kernel elements; and (5) processing of obtaining a sum total of values for each kernel. In this case, an amount of operation of multiplication is $dk^2$, and an amount of operation of addition is $2N^2+4dk^2+k^2-1$. Because the order is decreased, the amounts of operation may be greatly reduced.

The above-described information processing device 1 is a computer device in which, as illustrated in FIG. 26, coupled to one another by a bus 2519 are a memory 2501, a central processing unit (CPU) 2503, a hard disk drive (HDD) 2505, a display control unit 2507 coupled to a display device 2509, a drive device 2513 for a removable disk 2511, an input device 2515, and a communication control unit 2517 for coupling to a network. An operating system (OS) and an application program for performing the above-described processing are stored on the HDD 2505, and are read from the HDD 2505 into the memory 2501 when executed by the CPU 2503. The CPU 2503 controls the display control unit 2507, the communication control unit 2517, and the drive device 2513 according to the processing contents of the application program, and thereby makes the display control unit 2507, the communication control unit 2517, and the drive device 2513 perform given operation. Data in a process of being processed is stored mainly in the memory 2501, but may be stored on the HDD 2505. The application program for performing the above-described processing is distributed in a state of being stored on the computer readable removable disk 2511, and is installed from the drive device 2513 onto the HDD 2505. The application program may be installed onto the HDD 2505 via the network such as the Internet and the communication control unit 2517. Such a computer device implements the various functions described above when hardware such as the CPU 2503 and the memory 2501 described above and programs such as the OS and the application program organically cooperate with each other.

The information processing device includes: (A) a first calculating unit configured to identify, for each kernel element used in convolution operation, input values to be multiplied by the element in the convolution operation from among input values included in input data, and calculate a sum total of the identified input values; and (B) a second calculating unit configured to calculate, for each kernel element, a product of the sum total calculated by the first calculating unit for the element and the element, and calculate an average of the calculated products.

Therefore, the convolution operation is converted into a problem of obtaining sum totals of input values within rectangular regions, so that an amount of operation of the convolutional neural network in which average pooling is performed may be reduced.

The present information processing device may further include (C) a generating unit configured to generate a SAT from the input data. The above-described first calculating unit may (a1) calculate, as to a rectangular region including the identified input values, the sum total of the input values using the SAT. When the SAT is used, a sum total of input values within an arbitrary rectangular region is calculated in a constant time, so that a time taken to perform the convolution operation and the average pooling may be shortened.

The above-described second calculating unit may (b1) calculate the average of the products by dividing a sum total of the calculated products by the number of kernel elements.

An operation method for a convolutional neural network includes: (D) identifying, for each kernel element used in convolution operation, input values to be multiplied by the element in the convolution operation from among input values included in input data, and calculating a sum total of the identified input values; and (E) calculating, for each kernel element, a product of the sum total calculated for the element and the element, and calculating an average of the calculated products.

A program for making a computer perform the above processing may be created. The program is for example stored on or in a computer readable storage medium or a storage device such as a flexible disk, a compact disc read only memory (CD-ROM), a magneto-optical disk, a semiconductor memory or a hard disk. As an example, an intermediate processing result may be temporarily stored in a storage device such as a main memory.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An computer-implemented information processing method for a convolutional neural network processing input data, comprising:
    identifying, by a computer, for each of elements of a kernel used in convolution operation, input values to be multiplied by the respective elements in the convolution operation from among input values included in the input data;
    calculating a sum total of identified input values;
    calculating, for each of the elements of the kernel, a product of the sum total and the element;
    calculating an average of calculated products; and
    performing the convolution operation within the convolutional neural network based on the average of the calculated products.

2. The computer-implemented information processing method according to claim 1, further comprising:
    generating a summed area table from the input data; and
    calculating, for a rectangular region including the identified input values, the sum total using the summed area table.

3. The computer-implemented information processing method according to claim 1, further comprising:
    calculating the average by dividing a sum total of the calculated products by the number of the elements of the kernel.

4. The computer-implemented information processing method according to claim 1, further comprising:
    calculating an error between the average and a given value; and
    updating the elements of the kernel based on of the error.

5. The computer-implemented information processing method according to claim 1, wherein the input data is image data and the input values are pixel values.

6. The computer-implemented information processing method according to claim 2, wherein the sum total is calculated in a constant time by using the summed area table.

7. The computer-implemented information processing method according to claim 1, further comprising:
    storing, within a memory, the elements of the kernel used in convolution operation;
    generating a summed area table from the input data;
    reading the elements of the kernel stored in the memory when performing the convolution operation; and
    performing the convolution operation using the read elements of the kernel and the summed area table.

8. The computer-implemented information processing method according to claim 1, wherein the convolution operation within the convolutional neural network is performed based on the average of the calculated products to reduce computer processing time required for processing the input data.

9. An information processing device for a convolutional neural network, the information processing device comprising:
    a processor configured to perform operations;
    a memory configured to store a program,
    wherein the processor, based on the program, performs operations of:
    identifying, by a computer, for each of elements of a kernel used in convolution operation, input values to be multiplied by the respective elements in the convolution operation from among input values included in input data;
    calculating a sum total of identified input values;
    calculating, for each of the elements of the kernel, a product of the sum total and the element; and
    calculating an average of calculated products, wherein
    the convolution operation is performed within the convolutional neural network based on the average of the calculated products.

10. The information processing device according to claim 9, wherein the operations includes:
    generating a summed area table from the input data; and
    calculating, for a rectangular region including the identified input values, the sum total using the summed area table.

11. The information processing device according to claim 9, wherein the operations includes:
    calculating the average by dividing a sum total of the calculated products by the number of the elements of the kernel.

12. The information processing method according to claim 9, wherein the operations includes:
    calculating an error between the average and a given value; and
    updating the elements of the kernel based on of the error.

13. The information processing device according to claim 9, wherein the input data is image data and the input values are pixel values.

14. The information processing device according to claim 10, wherein the sum total is calculated in a constant time by using the summed area table.

15. A non-transitory computer-readable recording medium for storing a program to cause a computer within a convolutional neural network to perform operations on input data, the operations comprising:
- identifying, by a computer, for each of elements of a kernel used in convolution operation, input values to be multiplied by the respective elements in the convolution operation from among input values included in the input data;
- calculating a sum total of identified input values;
- calculating, for each of the elements of the kernel, a product of the sum total and the element;
- calculating an average of calculated products; and
- performing the convolution operation within the convolutional neural network based on the average of the calculated products.

16. The non-transitory computer-readable recording medium according to claim 15, further comprising:
- generating a summed area table from the input data; and
- calculating, for a rectangular region including the identified input values, the sum total using the summed area table.

17. The non-transitory computer-readable recording medium according to claim 15, further comprising:
- calculating the average by dividing a sum total of the calculated products by the number of the elements of the kernel.

18. The non-transitory computer-readable recording medium according to claim 15, further comprising:
- calculating an error between the average and a given value; and
- updating the elements of the kernel based on of the error.

19. The non-transitory computer-readable recording medium according to claim 15, wherein the input data is image data and the input values are pixel values.

20. The non-transitory computer-readable recording medium according to claim 16, wherein the sum total is calculated in a constant time by using the summed area table to accelerate image processing.

21. A computer-implemented information processing method for a convolutional neural network, the method comprising:
- storing, within a memory, a kernel including a plurality of kernel elements used in a convolution operation; and
- performing, with a processor, the convolution operation on received image data to provide processed image data, the convolution operation including convolution layer processing and pooling layer processing;
- generating a summed area table from the image data, the summed area table representing the image and including a plurality of summed total table elements;
- reading the kernel stored in the memory;
- calculating for each kernel element of the kernel a product of the kernel element and a corresponding summed total table element;
- calculating an average of the calculated products for each products; and
- storing the calculated average in the memory,
- wherein the average of the calculated products is used in the convolution operation performed by the processor within the convolutional neural network to provide the processed image data.

\* \* \* \* \*